United States Patent
Wang et al.

(10) Patent No.: US 11,242,488 B1
(45) Date of Patent: Feb. 8, 2022

(54) DEVICE FOR DETERMINING EXPANSION PRESSURE AND EXPANSION DISPLACEMENT GENERATED BY COKING COAL BASED ON SELF-REGULATION OF SPRING

(71) Applicant: Taiyuan University of Technology, Shanxi (CN)

(72) Inventors: Meijun Wang, Shanxi (CN); Nuannuan Yang, Shanxi (CN); Kechang Xie, Shanxi (CN); Yanfeng Shen, Shanxi (CN); Xiurong Ren, Shanxi (CN); Liping Chang, Shanxi (CN); Weiren Bao, Shanxi (CN)

(73) Assignee: Taiyuan University of Technology, Taiyuan (CN)

( * ) Notice: Subject to any disclaimer, the term of this patent is extended or adjusted under 35 U.S.C. 154(b) by 0 days.

(21) Appl. No.: 17/366,729

(22) Filed: Jul. 2, 2021

(30) Foreign Application Priority Data

Sep. 19, 2020 (CN) .......................... 202010989191.4

(51) Int. Cl.
*C10B 45/00* (2006.01)
*C10B 41/00* (2006.01)
*C10B 27/06* (2006.01)
*C10B 47/12* (2006.01)

(52) U.S. Cl.
CPC .............. *C10B 41/00* (2013.01); *C10B 27/06* (2013.01); *C10B 45/00* (2013.01); *C10B 47/12* (2013.01)

(58) Field of Classification Search
None
See application file for complete search history.

(56) References Cited

U.S. PATENT DOCUMENTS 9,340,740 B2 * 5/2016 Dohi ...................... C10B 57/06

FOREIGN PATENT DOCUMENTS

| CN | 200996001 Y | 12/2007 |
| CN | 203606055 U | 5/2014 |
| CN | 104710999 A | 6/2015 |
| CN | 105841868 A | 8/2016 |
| CN | 108659863 A | 10/2018 |
| GB | 8519470 | 9/1985 |
| JP | H04272992 A | * 9/1992 |
| JP | 2008143928 A | 6/2008 |

(Continued)

OTHER PUBLICATIONS

English translation of KR 20040106183 obtained from Espacenet.*
English translation of JP H04272992 obtained from Espacenet.*

*Primary Examiner* — Jonathan Luke Pilcher

(57) ABSTRACT

A device for determining an expansion pressure and an expansion displacement generated by coking coal based on self-regulation of a spring includes a pyrolysis reactor, which is provided in a high temperature carbonization furnace. Two porous pressing plates are provided at both sides of a coal sample, and two metal filter plates are provided at both sides of the sample. Upper and lower openings of the reactor are sealed respectively with a connecting flange. The pressing plate above the sample is connected to a mounting baffle of a detection mechanism through a lightweight connecting rod and a spring. The detection mechanism is provided with a displacement sensor and a pressure sensor. This application further provides a detection method using the above device.

8 Claims, 1 Drawing Sheet

(56) References Cited

FOREIGN PATENT DOCUMENTS

| KR | 20040106183 A | * | 12/2004 | | |
|----|---------------|---|---------|---|---|
| KR | 20130050807 A | | 5/2013 | | |
| WO | WO-2010050236 A1 | * | 5/2010 | ............. | C10B 45/00 |
| WO | WO-2012168802 A1 | * | 12/2012 | ............. | G01N 25/16 |

* cited by examiner

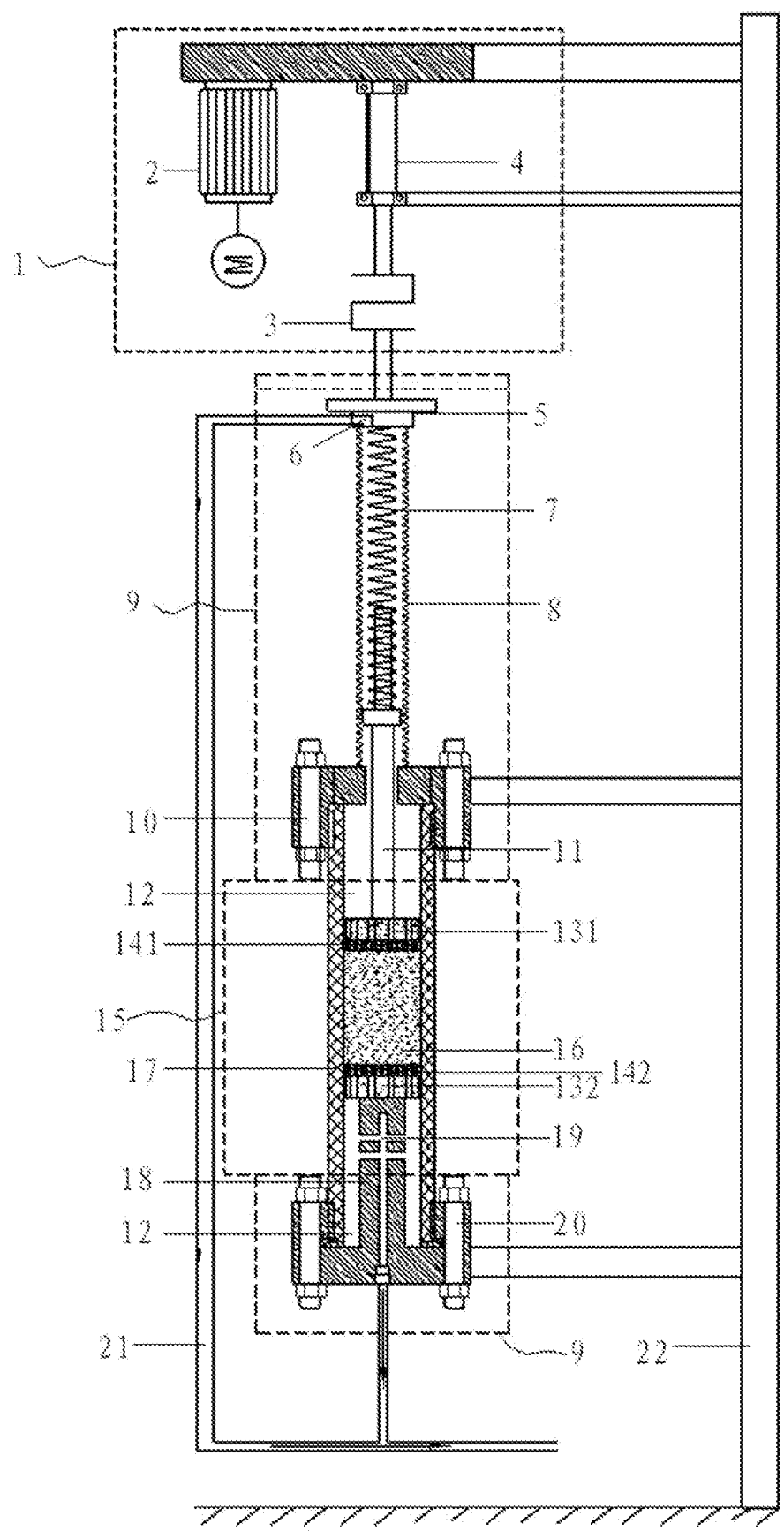

DEVICE FOR DETERMINING EXPANSION PRESSURE AND EXPANSION DISPLACEMENT GENERATED BY COKING COAL BASED ON SELF-REGULATION OF SPRING

CROSS-REFERENCE TO RELATED APPLICATIONS

This application claims the benefit of priority from Chinese Patent Application No. 202010989191.4, filed on Sep. 19, 2020. The content of the aforementioned application, including any intervening amendments thereto, is incorporated herein by reference in its entirety.

TECHNICAL FIELD

This application relates to coal blending and coking techniques in coking industries, and more particularly to a device for determining an expansion pressure and an expansion displacement generated by coking coal based on self-regulation of a spring.

BACKGROUND

When coal is subjected to thermal decomposition in a carbonization chamber with a certain volume, the coal will produces a certain pressure on the oven wall of the carbonization chamber because the coal fails to expand freely, and this pressure is called expansion pressure. The expansion pressure is the maximum pressure generated by the plastic mass formed by the coal material in the coking process when converging on a center surface of the carbonization chamber. In the coking process, an appropriate expansion pressure is required to ensure the coke quality. However, an excessive expansion pressure will damage the oven wall and increase difficulty in the coke pushing.

As a consequence, the accurate monitoring of the change pattern of expansion pressure during coking process, the maximum expansion pressure, and the influence of gravity of upper coal bed on the expansion pressure and displacement of lower coal bed during the coking process is beneficial to adjust the type and blending proportion of different coals in coal blend, optimize the coal blending process, reduce the coal blending cost and extend the working life of coke oven.

In the prior art, the expansion pressure of the coal during the coking process is often measured using a movable wall coke oven. However, this method generally involves the consumption of several hundred kilograms of coals. In addition, the movable wall has a large weight, and thus the generated friction will also significantly affect the test results.

Extensive researches have been conducted to reduce the coal consumption on the premise of ensuring precise measurement of the expansion pressure of the coking coal. Chinese patent No. 203606055U and Chinese patent application publication No. 105841868A respectively disclose a device for detecting expansion pressure of coking coal and a single-side heating device and method for detecting expansion pressure. These devices can detect the expansion pressure generated by the coking coal during the coking process with less coal consumption. However, the two devices also struggle with some disadvantages.

The device disclosed in Chinese patent No. 203606055U adopts a bottom heating mode, which does not conform to a horizontal heating mode of the coke oven in the actual coking process. Considering the poor thermal conductivity of the coal, the coal layer is prone to uneven heating under the unilateral heating condition, resulting in large measurement errors.

The device disclosed in Chinese patent application publication No. 105841868A adopts a horizontal unilateral heating mode and is provided with a flue-gas treatment system. Compared to the bottom heating mode, the horizontal unilateral heating is more feasible in the practical coking process; however, the dual-furnace structure in the device is unreasonably designed and the two furnaces are too close to each other, which causes an interaction between temperature fields of the two furnaces during the heating process, thereby affecting experimental results.

In the prior art, it has been rarely investigated to simulate the expansion pressure and expansion displacement of coal samples at different heights in a coke oven under the impact of gravity of the upper coal bed during the coking process, and explore the subsequent influence on the coke quality and the coke oven on a lab-scale device.

SUMMARY

An object of this application is to provide a device for determining expansion pressure and expansion displacement of coking coal based on self-regulation of spring to overcome the defects in the prior art. The device can accurately determine changes of the expansion pressure and expansion displacement generated by coking coal during coking process and simulate the influence of gravity of upper coal bed on the expansion pressure and expansion displacement of lower coal bed during the coking process.

Technical solutions of this application are described as follows.

In a first aspect, this application provides a device for determining an expansion pressure and an expansion displacement generated by coking coal based on self-regulation of a spring, comprising:
  a detection mechanism;
  a pyrolysis reactor;
  two porous pressing plates;
  two metal filter plates;
  an upper connecting flange;
  a lower connecting flange;
  a lightweight connecting rod;
  a spring;
  a sealed bellows;
  a volatile escape pipeline; and
  a carbonization furnace;
  wherein the detection mechanism is provided with a displacement sensor and a pressure sensor; a lower end of the detection mechanism is connected to a mounting baffle; the mounting baffle is configured to be driven by the detection mechanism to move up and down; and the mounting baffle is provided with a gas escape hole;
  the pyrolysis reactor is configured to accommodate and pyrolyze a coal sample; and upper and lower ends of the pyrolysis reactor are provided with an upper opening and a lower opening, respectively;
  the two porous pressing plates are provided in the pyrolysis reactor; the two porous pressing plates consist of a first porous pressing plate and a second porous pressing plate; the first porous pressing plate is provided on an upper side of the coal sample; the second porous pressing plate is provided on a lower side of the coal sample; and the first porous pressing plate and the second porous pressing plate are configured to compress and fix the coal sample;

the two metal filter plates are provided in the pyrolysis reactor and consist of a first metal filter plate and a second metal filter plate; the first metal filter plate is provided between the coal sample and the first porous pressing plate; and the second metal filter plate is provided between the coal sample and the second porous pressing plate;

the upper connecting flange is connected to the upper opening of the pyrolysis reactor; and a center of the upper connecting flange is provided with a through hole;

the lower connecting flange is connected to the lower opening of the pyrolysis reactor; a middle of the lower connecting flange is provided with a support rod extending into an inside of the pyrolysis reactor; an end of the support rod abuts against the second porous pressing plate at the lower side of the coal sample in the pyrolysis reactor to fix the second porous pressing plate; and the lower connecting flange is provided with a gas escape channel;

one end of the lightweight connecting rod is fixedly connected to an outer side of the first porous pressing plate, and the other end of the lightweight connecting rod passes through the through hole on the upper connecting flange to extend out of the pyrolysis reactor; and is capable of moving freely up and down in the pyrolysis reactor; and a gap is provided between the lightweight connecting rod and the through hole on the upper connecting flange;

one end of the spring is connected to the mounting baffle on the detection mechanism, and the other end of the spring is connected to the end of the lightweight connecting rod extending out of the pyrolysis reactor;

the sealed bellows is sheathed outside the spring; one end of the sealed bellows is fixed on the through hole on the upper connecting flange, and the other end of the sealed bellows is fixedly connected to the mounting baffle to form a sealed channel for communicating the through hole on the upper connecting flange with the gas escape hole on the mounting baffle;

the volatile escape pipeline is respectively connected to the gas escape hole on the mounting baffle and the gas escape channel on the lower connecting flange to discharge gas generated during a pyrolysis process of the coal sample from the upper opening and the lower opening of the pyrolysis reactor;

the pyrolysis reactor is provided in the carbonization furnace; and the detection mechanism and the pyrolysis reactor are fixed by a bracket.

In an embodiment, each of the two metal filter plates is filled with curved and intercommunicated nano-scale channels, which are configured to only allow the pass of pyrolytic volatiles generated during the pyrolysis process of the coal sample.

In an embodiment, each of the two porous pressing plates is a circular steel sheet whose surface is evenly provided axial circular holes; and a diameter of the axial circular holes is millimeter level.

In an embodiment, the two metal filter plates and the two porous pressing plates are directly stacked together; or integrally fixed with bolts for easy disassembly.

In an embodiment, the spring has high sensitivity and has a temperature-resistance range from room temperature to 500° C.; and the spring can accurately reflect changes of the expansion pressure and the expansion displacement.

In an embodiment, a gas slow-release space is provided between the lightweight connecting rod and a cylinder wall of the pyrolysis reactor, and between the support rod and the cylinder wall of the pyrolysis reactor, respectively. Based on such design, a large amount of volatile gas produced from the pyrolysis of the coal sample in a plastic mass state can be discharged out of the pyrolysis reactor in time into the gas slow-release space, avoiding measurement errors caused by the volatile gas remaining in the reaction system for long time.

In an embodiment, the gap provided between the lightweight connecting rod and the through hole on the upper connecting flange not only promotes the discharge of the volatile gas escaping from the gas slow-release space, but also avoids an error caused by a friction between the lightweight connecting rod and the upper connecting flange.

In an embodiment, the sealed bellows is a laser-welded bellows made of 316 stainless steel, and a length of the sealed bellows changes with deformations of the spring.

In an embodiment, a servo motor is provided on the detection mechanism to drive the mounting baffle to move. The displacement of the mounting baffle enables the spring to be compressed and loosened, thereby changing a pressure applied by the lightweight connecting rod on the coal sample.

In an embodiment, a heat tracing device is provided outside the sealed bellows, the upper connecting flange and the lower connecting flange, respectively. An inside of the heat tracing device is provided with a twining glass filament heating band for heat tracing, and a silicate insulation layer is provided on an outermost layer of the heat tracing device. A temperature of the heat tracing device is adjustable within a range from room temperature to 300° C. and can be kept constant for a long time, such that the volatile gas produced by the pyrolysis of the coal sample cannot be condensed in a gas pipeline, avoiding blocking the gas pipeline.

In an embodiment, the coal sample is a single coking coal with different bulk densities and particle sizes, or a blended coal composed of a coking coal and other types of coals in any ratio.

In a second aspect, this application provides a method of determining an expansion pressure and an expansion displacement generated by the coking coal using the above device, comprising:

placing the coal sample in the pyrolysis reactor; placing the first porous pressing plate and the second porous pressing plate at the upper and lower sides of the coal sample; placing the first metal filter plate between the first porous pressing plate and the coal sample and placing the second metal filter plate between the second porous pressing plate and the coal sample; sealing the upper opening and the lower opening of the pyrolysis reactor through the upper connecting flange and the lower connecting flange, respectively; connecting the mounting baffle of the detection mechanism sequentially to the spring and the lightweight connecting rod; allowing an end of the lightweight connecting rod to pass through the upper connecting flange to contact with the first porous pressing plate;

adjusting the mounting baffle to control deformation of the spring to apply a pressure on the coal sample;

pyrolyzing the coal sample by the carbonization furnace; and measuring, by the pressure sensor and the displacement sensor on the detection mechanism, deformation of the spring to obtain the expansion pressure and the expansion displacement generated by the coal sample during the pyrolysis process online.

In an embodiment, the pressure sensor and the displacement sensor are connected to a data acquisition system. The data acquisition system is configured to observe changes of the expansion pressure and the expansion displacement during the pyrolysis process of the coal sample and draw a change curve.

In an embodiment, the expansion pressure and the expansion displacement generated by the coal samples at different heights under gravity of the upper coal bed during the coking process can be simulated by changing the deformation of the spring to adjust the pressure applied on the coal sample, so as to simulate the influence of the gravity of the upper coal bed on the expansion pressure and the expansion displacement generated by the lower coal bed during the coking process.

Compared to the prior art, this application has the following beneficial effects.

The device of this application can determine the expansion pressure and expansion displacement generated by the single coking coal with different bulk densities and particle sizes under different heating rates or the blended coal by measuring the deformations of the spring during the coking process. The device provided herein has small coal consumption, simple operation, large testable pressure range and high accuracy and stability.

BRIEF DESCRIPTION OF THE DRAWINGS

This FIGURE is a schematic diagram of a device for determining an expansion pressure and an expansion displacement generated by coking coal based on self-regulation of a spring according to an embodiment of the present disclosure.

In this drawings: 1, detection mechanism; 2, servo motor; 3, pressure sensor; 4, displacement sensor; 5, mounting baffle; 6, gas escape hole; 7, spring; 8, sealed bellows; 9, heat tracing device; 10, upper connecting flange; 11, lightweight connecting rod; 12, gas slow-release space; 131, first porous pressing plate; 132, second porous pressing plate; 141, first metal filter plate; 142, second metal filter plate; 15, carbonization furnace; 16, coal sample; 17, pyrolysis reactor; 18, support rod; 19, gas escape channel; 20, lower connecting flange; 21, volatile escape pipeline; and 22, bracket.

DETAILED DESCRIPTION OF EMBODIMENTS

The present application will be further described in detail below with reference to the embodiments and accompanying drawings. These embodiments are merely illustrative, and are not intended to limit the scope of the application. Any changes, modifications and substitutions made by those of ordinary skill in the art without departing from the spirit of this application shall fall within the scope of this application.

As used herein, terms "upper", "lower", "left", "right" and "middle" are only illustrative, and are not intended to limit the scope of the application. In addition, changes or adjustments of the relative relationship without substantially changing the technical content shall also fall within the scope of this application.

Referring to an embodiment shown in the FIGURE, a device for determining an expansion pressure and an expansion displacement generated by coking coal based on self-regulation of a spring includes a detection mechanism 1, a pyrolysis reactor 17 and a carbonization furnace 15. The detection mechanism 1 and the pyrolysis reactor 17 are fixed on a bracket 22.

The pyrolysis reactor 17 provided in the carbonization furnace 15 is a steel cylinder with an upper opening and a lower opening at both ends, respectively. The upper opening and the lower opening of the pyrolysis reactor 17 are sealed through an upper connecting flange 10 and a lower connecting flange 20, respectively. A coal sample 16 is placed in the pyrolysis reactor 17. Two metal filter plates consist of a first metal filter plate 141 and a second metal filter plate 142. The first metal filter plate 141 is provided on an upper side of the coal sample 16. The second metal filter plate 142 is provided on a lower side of the coal sample 16. An outer side of the first metal filter plate 141 is provided with a first porous pressing plate 131, and an outer side of the second metal filter plate is provided with a second porous pressing plate 132. The first metal filter plate 141, the second metal filter plate 142, the first porous pressing plate 131 and the second porous pressing plate 132 are configured to compress and fix the coal sample 16.

A center of the upper connecting flange is provided with a through hole. A lightweight connecting rod passes through the through hole into the pyrolysis reactor 17 to compress the first porous pressing plate 131 fixed on the upper side of the coal sample 16. A gap is provided between a lightweight connecting rod 11 and the through hole on the upper connecting flange 10. A gas slow-release space 12 is provided between the lightweight connecting rod 11 and a cylinder wall of the pyrolysis reactor 17.

A middle of the lower connecting flange 20 is provided with a support rod 18. The support rod 18 extends into an inside of the pyrolysis reactor 17 to compress the second porous pressing plate 132 fixed on the lower side of the coal sample 16. The gas slow-release space 12 is provided between the support rod 18 and the cylinder wall of the pyrolysis reactor 17. The lower connecting flange 20 is provided with a gas escape channel 19 for commutating with the gas slow-release space 12.

The detection mechanism 1 is provided with a servo motor 2 and a mounting baffle 5. The servo motor 2 is configured to drive the mounting baffle to move up and down. The mounting baffle 5 is provided with a gas escape hole 6. The detection mechanism 1 is also provided with a displacement sensor 4 and a pressure sensor 3, respectively.

One end of a spring 7 is connected to the mounting baffle 5, and the other end of the spring 7 is connected to the end of the lightweight connecting rod 11 extending out of the pyrolysis reactor 17. The mounting baffle 5 moves up and down, which drives the lightweight connecting rod 11 move freely up and down in the pyrolysis reactor 17. A sealed bellows 8 is sheathed outside the spring 7. One end of the sealed bellows 8 is fixedly connected to the mounting baffle 5, and the other end of the sealed bellows 8 is fixed on the through hole on the upper connecting flange 10 to form a sealed channel for communicating the through hole on the upper connecting flange 10 with the gas escape hole 6 on the mounting baffle 5.

A volatile escape pipeline 21 is respectively connected to the gas escape hole 6 on the mounting baffle 5 and the gas escape channel 19 on the lower connecting flange 20 to discharge gas generated during a pyrolysis process of the coal sample 16 from the upper opening and the lower opening of the pyrolysis reactor 17.

An inside of a heat tracing device 9 is provided with a twining glass filament heating band for heat tracing. A silicate insulation layer is provided on an outermost layer of the heat tracing device 9. The heat tracing device 9 is configured to perform auxiliary heating on the sealed bellows 8, the upper connecting flange 10 and the lower connecting flange 20.

Embodiment 1

The coal sample 16 is placed in the pyrolysis reactor 17 in the carbonization furnace 15. The first porous pressing plate 131 and the second porous pressing plate 132 are placed at the upper and lower sides of the coal sample 16. The first metal filter plate 141 is placed between the first porous pressing plate 131 and the coal sample 16. The second metal filter plate 142 is placed between the second porous pressing plate 132 and the coal sample 16. The upper opening and the lower opening of the pyrolysis reactor 17 are sealed through the upper connecting flange 10 and the lower connecting flange 20, respectively. The first porous pressing plate 131 above the pyrolysis reactor 17 is successively connected to the lightweight connecting rod 11, the spring 7, the mounting baffle 5, the pressure sensor 3 and the displacement sensor 4. The sealed bellows 8 is used for sealing between the mounting baffle 5 and the upper connecting flange 10. An upper end of the volatile escape pipeline 21 is communicated with the gas slow-release space 12 above the pyrolysis reactor 17 through the gas escape hole 6, an inner channel of the sealed bellows 8 and the through hole of the upper connecting flange 10. A lower end of the volatile escape pipeline 21 is communicated with the gas slow-release space 12 below the pyrolysis reactor 17 through the gas escape channel 19.

The servo motor 2 is operated to adjust the spring 7 to an initial state (with the largest length).

The coal sample 16 is pyrolyzed by programmed heating, and the volatiles produced from the pyrolysis of the coal sample 16 enter into the gas slow-release space 12 through the two metal filter plates and the two porous pressing plates on both sides of the coal sample 16, respectively, and then are discharged out of the device through the volatile escape pipeline 21.

A data collection system is provided to collect data from the pressure sensor 3 and the displacement sensor 4 to obtain a variation trend of the expansion pressure and the expansion displacement generated by the coal sample 16 with the pyrolysis temperature during the coking process, and the maximum expansion pressure during the pyrolysis can be obtained.

Embodiment 2

The coal sample 16 is placed into the pyrolysis reactor 17 and the device is assembled in the same way as Embodiment 1. The servo motor 2 is operated to make the high temperature resistant spring 7 to produce different degrees of compression deformation, so as to change the pressure applied to the coal sample 16.

The coal sample 16 is pyrolyzed by programmed heating, and the volatiles produced from the pyrolysis of the coal sample 16 enter into the gas slow-release space 12 through the two metal filter plates and the two porous pressing plates on both sides of the coal sample 16, respectively, and then are discharged out of the device through the volatile escape pipeline 21.

A data collection system is provided to collect the data from the pressure sensor 3 and the displacement sensor 4 to simulate the expansion pressure and the expansion displacement generated by the coal sample 16 at different heights under gravity of the upper coal bed during the coking process.

What is claimed is:
1. A device for determining an expansion pressure and an expansion displacement generated by coking coal based on self-regulation of a spring, the device comprising:
   a detection mechanism;
   a pyrolysis reactor;
   two porous pressing plates;
   two metal filter plates;
   an upper connecting flange;
   a lower connecting flange;
   a lightweight connecting rod;
   the spring;
   a sealed bellows;
   a volatile escape pipeline; and
   a carbonization furnace;
   wherein the detection mechanism comprises a displacement sensor and a pressure sensor; a lower end of the detection mechanism is connected to a mounting baffle; the mounting baffle is configured to be driven by the detection mechanism to move up and down; and the mounting baffle comprises a gas escape hole;
   the pyrolysis reactor is configured to accommodate and pyrolyze a coal sample; and upper and lower ends of the pyrolysis reactor comprise an upper opening and a lower opening, respectively;
   the two porous pressing plates are disposed within the pyrolysis reactor; the two porous pressing plates consist of a first porous pressing plate and a second porous pressing plate; the first porous pressing plate is disposed on an upper side of the coal sample; the second porous pressing plate is disposed on a lower side of the coal sample; and the first porous pressing plate and the second porous pressing plate are configured to compress and fix the coal sample;
   the two metal filter plates are disposed within the pyrolysis reactor and consist of a first metal filter plate and a second metal filter plate; the first metal filter plate is disposed between the coal sample and the first porous pressing plate; and the second metal filter plate is disposed between the coal sample and the second porous pressing plate;
   the upper connecting flange is connected to the upper opening of the pyrolysis reactor; and a center of the upper connecting flange comprises a through hole;
   the lower connecting flange is connected to the lower opening of the pyrolysis reactor; a middle of the lower connecting flange comprises a support rod extending into an inside of the pyrolysis reactor; an end of the support rod abuts against the second porous pressing plate at the lower side of the coal sample in the pyrolysis reactor to fix the second porous pressing plate; and the lower connecting flange comprises a gas escape channel;
   one end of the lightweight connecting rod is fixedly connected to an outer side of the first porous pressing plate, and the other end of the lightweight connecting rod passes through the through hole on the upper connecting flange to extend out of the pyrolysis reactor and is capable of moving freely up and down in the pyrolysis reactor; and a gap is disposed between the lightweight connecting rod and the through hole on the upper connecting flange;
   one end of the spring is connected to the mounting baffle on the detection mechanism, and the other end of the spring is connected to the end of the lightweight connecting rod extending out of the pyrolysis reactor;
   the sealed bellows is sheathed outside the spring; one end of the sealed bellows is fixed on the through hole on the upper connecting flange, and the other end of the sealed bellows is fixedly connected to the mounting baffle to form a sealed channel for communicating the through hole on the upper connecting flange with the gas escape hole on the mounting baffle;

the volatile escape pipeline is respectively connected to the gas escape hole on the mounting baffle and the gas escape channel on the lower connecting flange to discharge gas generated during a pyrolysis process of the coal sample from the upper opening and the lower opening of the pyrolysis reactor;

the carbonization furnace comprises the pyrolysis reactor; and the detection mechanism and the pyrolysis reactor are fixed by a bracket.

2. The device of claim 1, wherein surfaces of the first porous pressing plate and the second porous pressing plate each comprise axial circular holes that are evenly spaced.

3. The device of claim 1, wherein a gas slow-release space is disposed between the lightweight connecting rod and a cylinder wall of the pyrolysis reactor, and between the support rod and the cylinder wall of the pyrolysis reactor, respectively.

4. The device of claim 1, wherein the detection mechanism comprises a servo motor which is configured to drive the mounting baffle to move.

5. The device of claim 1, wherein a heat tracing device is provided outside the sealed bellows, the upper connecting flange and the lower connecting flange, respectively.

6. The device of claim 5, wherein an inside of the heat tracing device comprises a twining glass filament heating band, and an outside of the heat tracing device comprises a silicate insulation layer.

7. A method of determining an expansion pressure and an expansion displacement generated by coking coal using the device of claim 1, comprising:

placing a coal sample in the pyrolysis reactor; placing the first porous pressing plate and the second porous pressing plate at the upper and lower sides of the coal sample; placing the first metal filter plate between the first porous pressing plate and the coal sample and placing the second metal filter plate between the second porous pressing plate and the coal sample; sealing the upper opening and the lower opening of the pyrolysis reactor through the upper connecting flange and the lower connecting flange, respectively; connecting the mounting baffle of the detection mechanism sequentially to the spring and the lightweight connecting rod; and allowing an end of the lightweight connecting rod to pass through the upper connecting flange to contact with the first porous pressing plate;

adjusting the mounting baffle to control deformation of the spring to apply a pressure on the coal sample; and pyrolyzing the coal sample using the carbonization furnace; and measuring, using the pressure sensor and the displacement sensor of the detection mechanism, deformation of the spring to obtain the expansion pressure and the expansion displacement.

8. The method of claim 7, wherein the coal sample is a single coking coal composed of particles which vary in size, or a blended coal composed of a coking coal and other types of coals in any ratio.

* * * * *